United States Patent [19]

Flamm et al.

[11] Patent Number: 4,729,014

[45] Date of Patent: Mar. 1, 1988

[54] DIGITAL CIRCUIT FOR STEEPENING COLOR-SIGNAL TRANSITIONS

[75] Inventors: Peter M. Flamm; Rolf Deubert, both of Freiburg, Fed. Rep. of Germany

[73] Assignee: Deutsche ITT Industries GmbH, Freiburg, Fed. Rep. of Germany

[21] Appl. No.: 853,479

[22] Filed: Apr. 18, 1986

[30] Foreign Application Priority Data

Apr. 19, 1985 [EP] European Pat. Off. ...... 85 104 771.2

[51] Int. Cl.$^4$ ............................................. H04N 9/064
[52] U.S. Cl. ......................................... 358/37; 358/40
[58] Field of Search ................... 358/37, 40, 36, 166, 358/284

[56] References Cited

U.S. PATENT DOCUMENTS

| | | | |
|---|---|---|---|
| 4,281,347 | 7/1981 | Tschannen | 358/37 |
| 4,414,564 | 11/1983 | Hitchcock | 358/37 |
| 4,542,475 | 9/1985 | Acampora | 364/724 |
| 4,581,631 | 4/1986 | Sonnenberger | 358/37 |

FOREIGN PATENT DOCUMENTS 1562170 8/1970 Fed. Rep. of Germany .

OTHER PUBLICATIONS

Thomas Fischer, "Digital VLSI Breeds Next-Generation TV Receivers", *Electronics*, vol. 54, No. 16, Aug. 11, 1981, pp. 97-103.

Klaus Juhnke, "Four Standard Colour Decoder with Picture Improvement", *IEEE Transactions on Consumer Electronics*, vol. CE-19, No. 4, Nov. 1983, pp. 451-461.

VALVO Publications: "Technische Information 840228 (Feb. 28, 1984): Versteilerung von Farbsignalsprungen and Leuchtdichtesignal-Verzogerung mit der Schaltung TDA 4560".

*Primary Examiner*—James J. Groody
*Assistant Examiner*—Robert M. Bauer
*Attorney, Agent, or Firm*—T. L. Peterson

[57] ABSTRACT

This circuit arrangement is designed for use in digital color-television receivers or the like and contains for each of the two digital color-difference signals a slope detector to which both a digital signal defining an amplitude threshold value and a digital signal defining a time threshold value are applied. At least one intermediate value occurring during an edge to be steepened is stored, and at the same time value of the steepened edge, it is "inserted" into the latter. This is done by means of memories switches, output registers, and a sequence controller.

4 Claims, 8 Drawing Figures

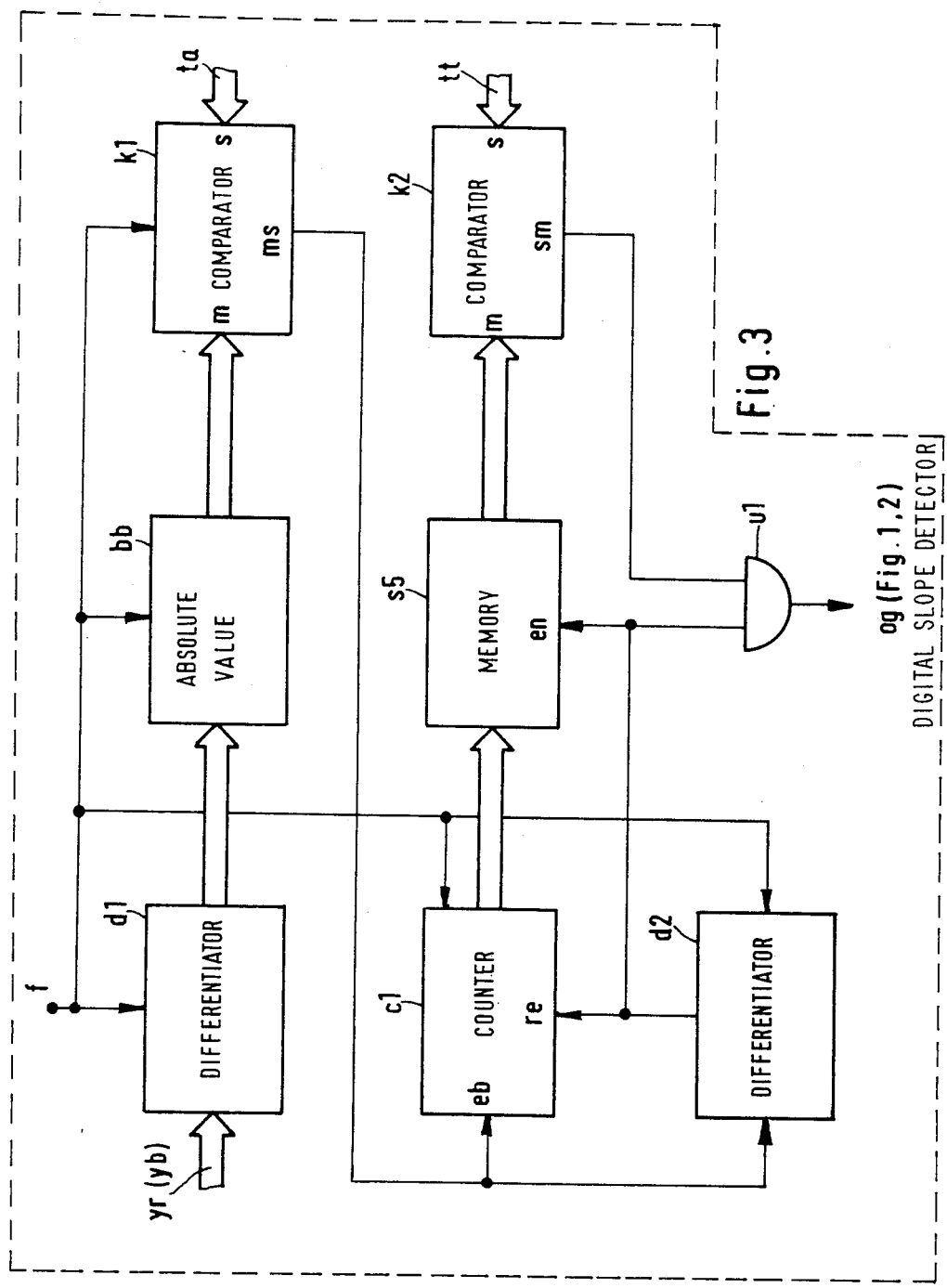

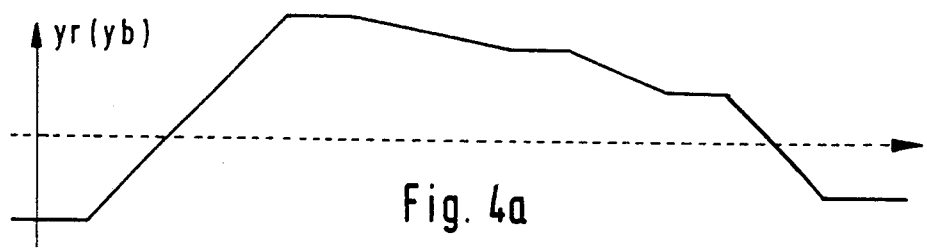
Fig. 4a
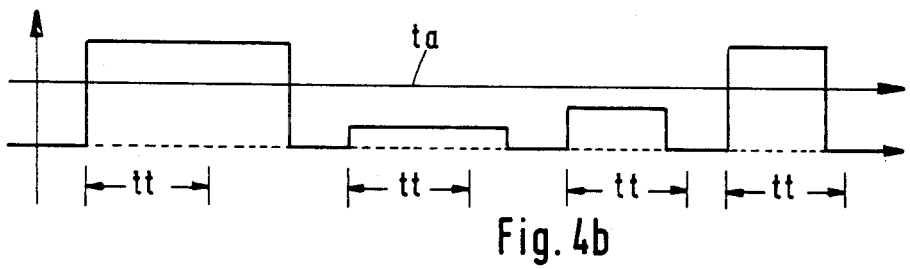
Fig. 4b
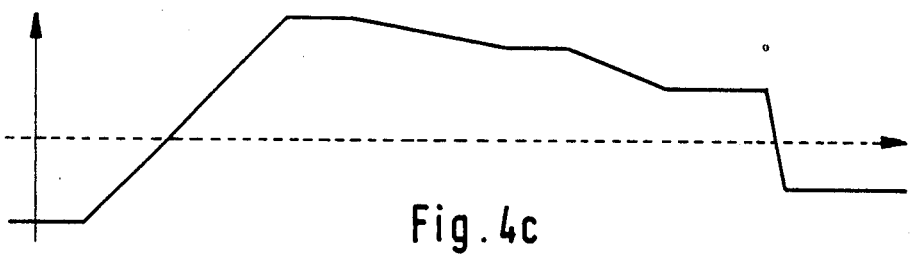
Fig. 4c
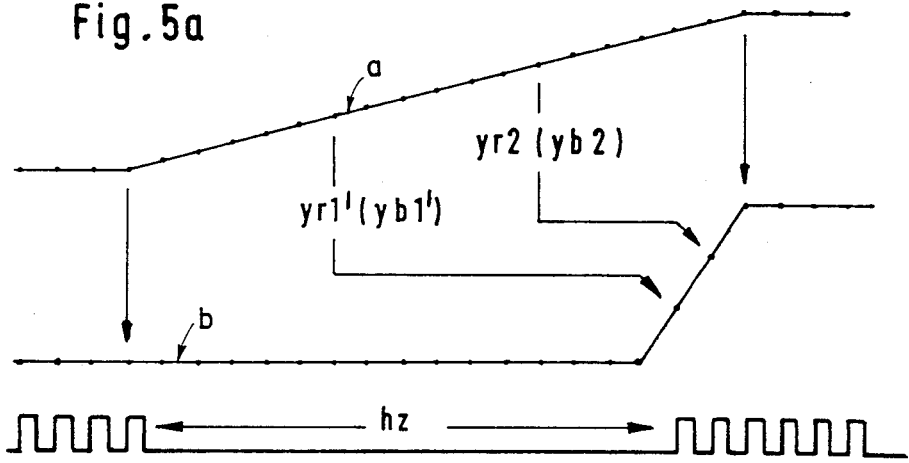
Fig. 5a
Fig. 5b

DIGITAL CIRCUIT FOR STEEPENING COLOR-SIGNAL TRANSITIONS

BACKGROUND OF THE INVENTION

The invention pertains to a circuit for steepening color-signal transitions in color television receivers or the like.

A circuit arrangement of this kind includes a slope detector which, when a predetermined amplitude threshold value is exceeded, delivers a switching signal which causes a substitute signal to appear at the respective output of the two color-difference channels for the duration of the system rise time of said channels. One circuit arrangement of this kind, which provides a chroma transient improvement, is described in a publication by VALVO entitled "Technische Information 840228 (Feb. 28, 1984): Versteilerung von Farbsignalsprungen and Leuchtdichtesignal-Verzogerung mit der Schaltung TDA 4560".

The bandwidth of the color-difference channel is very small compared with the bandwidth of the luminance channel, namely only about 1/5 that of the luminance channel in the television standards now in use. This narrow bandwidth leads to blurred color transitions ("color edging") in case of sudden color-signal changes, e.g., at the edges of the usual color-bar test signal, because, compared with the associated luminance-signal transition, an approximately fivefold duration of the color-signal transition results from the narrow transmission bandwidth.

In the prior circuit arrangement, the relatively slowly rising color-signal edges are steepened by suitably delaying the color-difference signals and the luminance signal and steepening the edges of the color-difference signals at the end of the delay by suitable analog circuits. The color-difference signals and the luminance signal are present and processed in analog form as usual.

The problem to be solved by the invention is to modify the principle of the prior art analog circuits in such a way that it can be used in known color-television receivers with digital signal-processing circuitry (cf. "Electronics", Aug. 11, 1981, pages 97 to 103), with the slope detector responding not only to one criterion, namely a predeterminable amplitude threshold value as in the prior art arrangement, but to an additional criterion.

SUMMARY OF THE INVENTION

In accordance with the invention a circuit arrangement provides a fully digital solution for chroma transient improvement. The circuit arrangement contains a slope detector, a memory, a switch-over switch and a timing control stage for the processing of each color difference signal. A time period threshold signal and an amplitude threshold signal are fed to the slope detector. If the amplitude threshold is exceeded and the time threshold is not being reached, the slope is improved.

This circuit arrangement is designed for use in digital color-television receivers or the like and contains for each of the two digital color-difference signals a slope detector to which both a digital signal defining an amplitude threshold value and a digital signal defining a time threshold value are applied. At least one intermediate value occurring during an edge to be steepened is stored, and at the same time value of the steepened edge, it is "inserted" into the latter. This is done by means of memories, switches, output registers, and a sequence controller.

BRIEF DESCRIPTION OF THE DRAWING

The invention will be better understood from a reading of the following detailed description in conjunction with the drawing in which:

FIG. 3 is a block diagram of an embodiment of the slope detectors of FIGS. 1 and 2;

FIGS. 4a–c shows various waveforms to explain the basic operation of the invention; and FIGS. 5a and 5b shows waveforms to explain the operation of the improved arrangement of FIG. 2.

DETAILED DESCRIPTION

Figure 1:
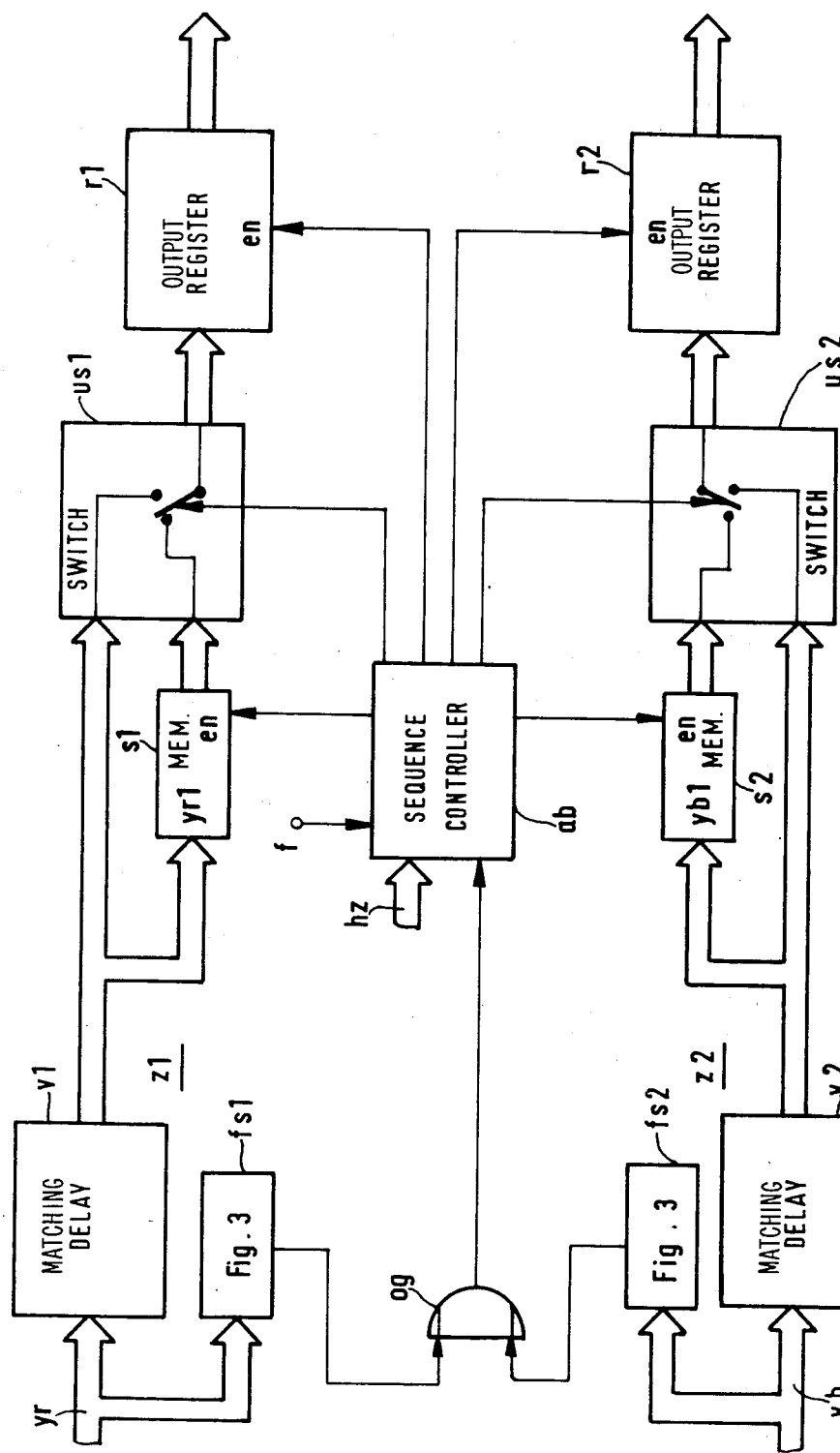
FIG. 1 is a block diagram of a first embodiment of the invention.

In the block diagram of FIG. 1, the digital color-difference signals yr, yb are present in the baseband at the frequency of the clock signal f, which is four times the chrominance-subcarrier frequency, i.e., the individual data words appear one after the other at this frequency. If a subharmonic of the clock signal f, i.e., the chrominance-subcarrier frequency itself, for example, is chosen for the color-difference-signal demodulation as may be the case in known digital color-television receivers, these digital signals must be brought to the aforementioned repetition frequency of the clock signal f by digital interpolation.

In FIG. 1, there are two branches for the two color-difference signal yr and yb, respectively. They are of the same design, with the branch z1 assigned to the red-minus-luminance channel, and the branch z2 to the blue-minus-luminance channel. In the branch z1, the red-minus-luminance signal yr is applied to the inputs of the first delay element v1 and the first digital slope detector fs1. The output of the first delay element v1 is fed to the input of the first memory s1 and to one of the inputs of the first switch us1, whereas the output of the first memory s1 is connected to the other input of the first switch us1, whose output is coupled to the input of the first output register r1.

The second branch z2, to which the blue-minus-luminance signals yb are applied, is of the same design as the first branch z1 as far as the individual circuits and their interconnections are concerned, and contains the second digital slope detector fs2, the second delay element v2, the second memory s2, the second switch us2, and the second output register r2.

The output signals of the two slope detectors fs1, fs2 are applied, respectively, to the first and second inputs of the OR gate og, whose output is connected to the first input of the sequence controller ab. The second input of the latter is presented with the clock signal f, and the third input with the digital signal hz, by which the hold time equal to the system rise time of the color-difference channels can be preset. The outputs of the sequence controller ab are connected to the enable inputs en of the first and second memories s1, s2 and of the first and second output registers r1, r2 and to the control inputs of the two switches us1, us2.

The sequence controller ab controls these subcircuits as follows. A red-minus-luminance signal value yr1 and a blue-minus-luminance signal value yb1 occurring at an intermediate value of the hold time are read into the memories s1 and s2, respectively. This intermediate value of the hold time lies preferably in the middle of the hold time. Furthermore, the sequence controller causes the contents of the memories s1 and s2 to be transferred via the associated switches us1 and us2 into the associated output registers r1 and r2, respectively, at the corresponding intermediate value, preferably one-half, of the steepened leading edge, while at all times other than the instant of the intermediate value of the steepened leading edge, the inputs of the associated output registers are connected to the outputs of the delay elements v1 and v2, respectively.

Figure 2:
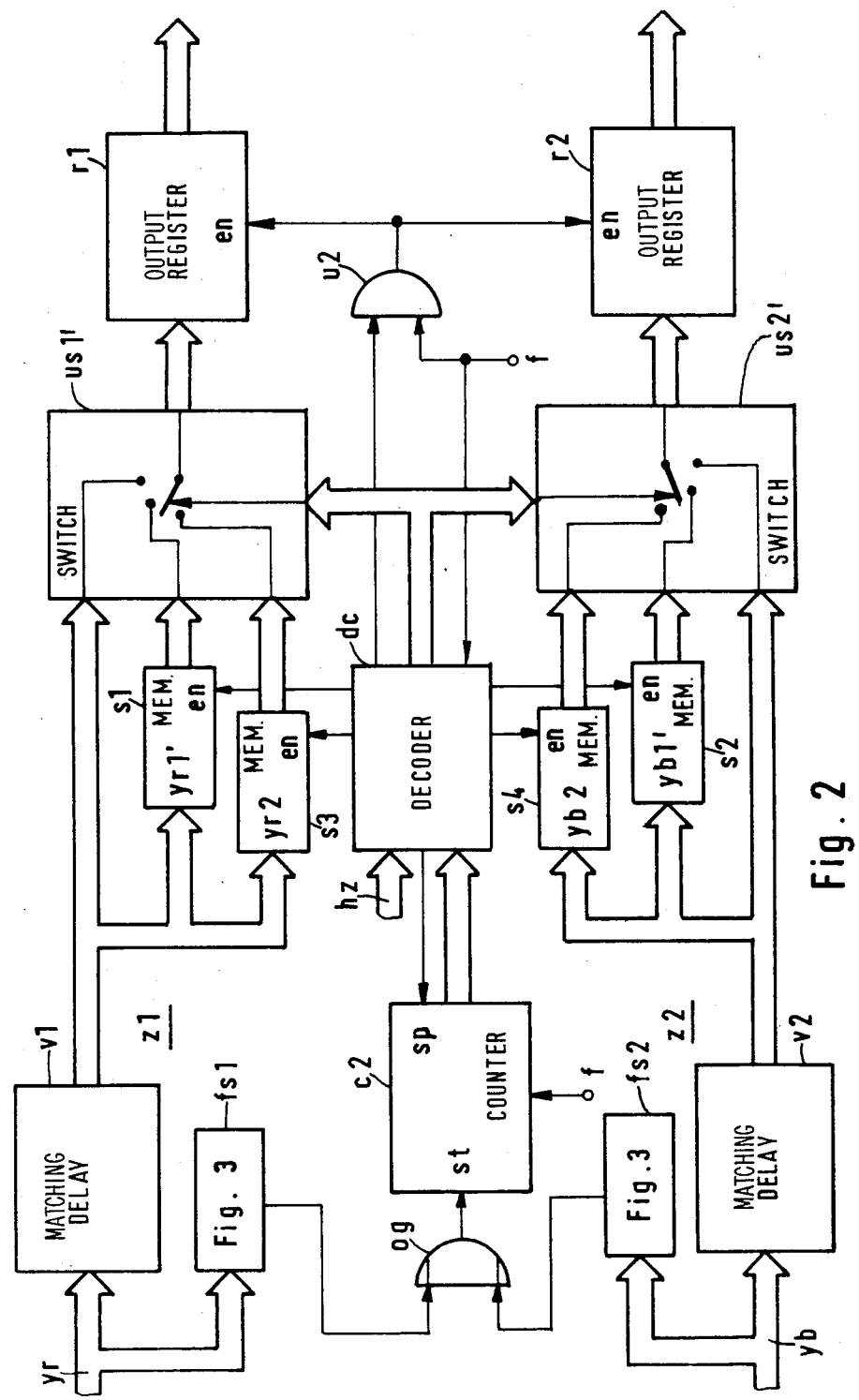
FIG. 2 is a block diagram of a second form of the arrangement of FIG. 1.

The block diagram of FIG. 2 shows an improved version of the arrangement of FIG. 1. The improvement is that the first and second memories s1 and s2 of FIG. 1 have been supplemented with the third and fourth memories s3 and s4, respectively, each of which is connected in parallel with the associated memory, and that the two switches us1 and us2 of FIG. 1 have been expanded into multiposition switches us1' and us2' each having one additional input connected to the output of the third memory s3 and the output of the fourth memory s4, respectively.

This improved portion of FIG. 2 concerns the sequence controller ab of FIG. 1. In FIG. 2, the latter consists of the counter c2, which counts the pulses of the clock signal s, the decoder dc, and the AND gate u2. The start input st of the counter c2 is connected to the output of the OR gate og, whereas the stop input sp is controlled by the decoder dc. The digital signal hz is fed to the decoder dc, cf. FIG. 1.

The counts of the counter c2 are decoded by reading the red- and blue-minus-luminance signal values occurring at the end of the first third of the hold time, i.e., the values yr1' and yb1', into the first memory s1 and the second memory s2, respectively, and the red- and blue-minus-luminance signal values occurring at the end of the second third of the hold time, i.e., the values yr2 and yb2, into the third memory s3 and the fourth memory s4, respectively. At the end of the first third and second third, respectively, of the steepened leading edge, the contents of the memories s1 and s3, respectively, are transferred through the switch us1' into the output register r1, and at the end of the first third and second third, respectively of that edge, the contents of the memories s2 and s4, respectively, are transferred through the switch us2' into the output register r2. The inputs of the two outputs registers are connected to the outputs of the first and second delay elements v1 and v2, respectively, except at the end of the first and second thirds, respectively, of the steepened leading edge.

The clock signal f is applied to one of the inputs of the AND gate u2, whose other input is connected to one of the outputs of the decoder dc, and whose output is coupled to the enable inputs en of the first and second output registers r1, r2.

The block diagram of FIG. 3 shows a preferred embodiment of the circuit of the slope detectors fs1, fs2. The input for the color-difference signal yr, yb is followed by the series combination of the first digital differentiator d1, the digital absolute-value stage bb, and the minuend input m of the first digital comparator k1. The subtrahend input s of the latter is presented with the digital signal corresponding to the amplitude threshold value, the signal ta.

The absolute-value stage bb delivers digital values which are unsigned, i.e., which have no sign bit, for example.

Accordingly, the absolute-value stage bb contains a subcircuit which changes negative binary numbers in, e.g., one's or two's complement representation into the corresponding positive binary number, i.e., a recomplementer.

The term "comparator" as used herein means a digital circuit which compares the two digital signals appearing at the two inputs to determine which of the two signals is greater. Since, purely formally, such a comparison is closer to the arithmetic operation of subtraction than to that of addition although the concrete internal circuitry of such comparators is more similar to that of adders than to that of subtracters, the two inputs of the comparator are called "minuend input" and "subtrahend input" as in the case of a subtracter. The three logic output signals are "minuend greater than subtrahend", "subtrahend greater than minuend", and "minuend equal to subtrahend". Thus, in positive logic, the more positive logic level will appear at the minuend-greater-than-subtrahend output of a comparator if and as long as the minuend is greater than the subtrahend. If needed, the more negative logic level appearing at this output may serve to signal the "minuend-smaller-than-subtrahend" function, i.e., it is also possible to use negative logic.

In the slope detector of FIG. 3, the enable input eb of the first clock-pulse counter c1 and one of the inputs of the second digital differentiator d2 are connected to the minuend-greater-than-subtrahend output ms of the first comparator k1. The count outputs of the first counter c1 are coupled to the input of the fifth memory s5, which has its output connected to the minuend input m of the second digital comparator k2. The subtrahend input s of the latter is presented with a digital signal corresponding to the time threshold value, the signal tt.

The reset input re of the first counter c1, the enable input en of the fifth memory s5, and the first input of the first AND gate u1 are connected to the output of the second differentiator d2. The subtrahend-greater-than-minuend output sm of the second comparator k2 is connected to the second input of the second AND gate u2, whose output is fed to the OR gate of FIGS. 1 or 2. The subcircuits d1, bb, k1, d2, and, as mentioned above, c1 are clocked by the clock signal f.

FIGS. 4a–c and 5a and b serve to illustrate the operation of the circuit arrangement in accordance with the invention. FIG. 4a shows the assumed shape of one of the two color-difference signals yr, yb; it should be noted that, in those figures, the representation commonly used for analog signals has been chosen for simplicity.

FIG. 4b shows the output signal of the absolute-value stage bb and the amplitude threshold value corresponding to the digital signal ta. Also shown is the time threshold value corresponding to the digital signal tt. FIG. 4c shows the shape of the assumed color-difference signal of FIG. 4a as it appears at the output of the output register r1, r2 of FIG. 1 or FIG. 2. A comparison between FIGS. 4a and 4c shows that the last edge on the right has been steepened since, during this edge, both the amplitude threshold value is exceeded and the time threshold value is not reached (cf. the use of the subtrahend-greater-than-minuend output sm of the second comparator k2), the steepening function becomes effective. The first comparator k1 provides a signal at the minuend-greater-than-subtrahend output ms as long as the output signal of the absolute-value stage bb is greater than the amplitude threshold value. During that time, the first counter c1 can count the clock pulses until it is reset by a signal derived by the second differentiator d2 from the trailing edge of the output signal of the first comparator k1. The previous count of the counter c1 is transferred into the fifth memory s5 and compared with the time threshold value by the second comparator k2. If the time threshold value is greater than the period measured by the counter c1, the above-mentioned function will be initiated.

FIGS. 5a and 5b serve to explain how the steepened edge is formed. Curve a of FIG. 5a shows a slowly rising edge used for the explanation. The distances between the points in curves a and b of FIG. 5a are to illustrate the period of the clock signal f. FIG. 5b shows the waveform at the enable inputs en of the output registers r1, r2. At the arrow shown on the left between curves a and b of FIG. 5a, the signal periodically applied to these inputs at the repetition rate of the clock signal f is stopped, so to speak, so that no signals are transferred to the output registers r1, r2 over several clock periods, but the signal read in at the "clocking" of the enable inputs en is retained in those registers. After the "clocking" of the enable inputs of the output registers r1, r2 has resumed at the beginning of the edge to be steepened, the signal values yr1', yb1' and yr2, yb2 read into the memories s1, s2 and s3, s4 at the end of the first third and the second third, respectively, of the slowly rising edge of curve a of FIG. 5a are transferred into the output registers r1, r2 at the end of the first third and the second third, respectively, of this edge. The arrow shown on the right between curves a and b of FIG. 5a is to indicate that, at the end of the slowly rising edge of curve a, the steepened edge of curve b has reached the desired signal value.

The period for which the "clocking" of the enable inputs en of the output registers r1, r2 is "interrupted" is equal to the duration of the digital signal hz fed to the sequence controller ab of FIG. 1 or to the decoder dc of FIG. 2.

The circuit arrangement in accordance with the invention can be readily implemented in monolithic integrated form. As it uses exclusively digital circuits, it is especially suited for integration using insulated-gate field-effect transistors, i.e., MOS technology.

What is claimed is:

1. A circuit arrangement for steepening color-signal transitions, comprising:
   first and second circuit branches, said first branch receiving a first color difference digital signal from a first color difference channel and said second branch receiving a second color difference digital signal from a second color difference channel, each of said branches comprising:
      a digital slope detector for generating a control signal at an output when the respective one of said first or second color difference digital signals has a predetermined relationship to predetermined amplitude and time thresholds;
      a first delay element receiving and delaying said respective one color difference digital signal by a time equal to the delay of said digital slope detector;
      at least one memory having its input connected to the output of said first delay element;
      a switch having first and second inputs connected to the outputs of said delay element and said at least one memory, respectively; and
      an output register having its input connected to the output of said switch;
   and
   a sequence controller coupled to the outputs of said digital slope detectors in said first and second circuit branches, and receiving a clock signal having a predetermined frequency relationship to a chrominance subcarrier frequency, and receiving a digital signal determining the hold time equal to the known system rise time of said first and second color difference channels, said sequence controller providing sequence control signals for controlling said at least one memory, said switch and said output register in both of said first and second circuit branches such that:
      a color difference signal value occurring at an intermediate value of said hold time is read into said memory, said color difference signal value stored in said memory is read via said switch into said output rergister at the corresponding intermediate value of the steepened leading edge of said color-signal, the input of said output register being connected to the output of said delay element at all times except at said intermediate value of said steepened leading edge.

2. A circuit arrangement in accordance with claim 1, wherein each said slope detector comprises:
   a first digital differentiator receiving the respective color difference digital signal;
   a digital absolute value stage coupled to said first digital differentiator output;
   a first digital comparator having a minuend input coupled to said digital absolute value stage output, a subtrahend input supplied with a digital signal corresponding to said amplitude threshold value, and an output;
   a second digital differentiator having an input coupled to said comparator output;
   a counter for counting pulses of said clock signal, said counter having an enable input coupled to said comparator output, and having a reset input coupled to the output of said second digital differentiator;
   a fifth memory having its inputs coupled to the count outputs of said counter and an enable input coupled to said second digital differentiator output;
   a second digital comparator having a minuend input coupled to the output of said fifth memory, a subtrahend input supplied with a digital signal corresponding to said time threshold value; and
   gate means for combining the output of said comparator and the output of said second digital differentiator to provide said control signal when the output of said comparator and the output of said second digital differentiator are both active.

3. A circuit arrangement in accordance with claim 2, wherein each of said first and second circuit branches further comprises a second memory having its input connected to said first delay element output, said switch having a third input coupled to said second memory output; and
wherein said sequence controller comprises:
   a counter for counting pulses of said clock signal; and
   a decoder for decoding the count output of said counter to provide said sequence control signals, said sequence control signals also controlling each said second memory, said sequence controller operating such that color difference signal values occurring at the end of the first third of said hold time are written into said at least one memory, and color difference signal values occurring at the end of the second third of said hold time are written into said second memory; and wherein:

in said first circuit branch the contents of said at least one memory and said second memory are written via said switch into said output register at the end of the first third and at the end of the second third, respectively, of said steepened leading edge;

in said second circuit branch the contents of said at least one memory and said second memory are written via said switch into said output register at the end of the first third and the second third, respectively, of said steepened leading edge; and the input of the respective output register of each of said first and second circuit branches is connected to the output of the respective first delay element at all times except at the end of said first third and said second third or said steepened leading edge.

4. A circuit arrangement in accordance with claim 1, wherein each of said first and second circuit branches further comprises a second memory having its input connected to said first delay element output, said switch having a third input coupled to said second memory output;

wherein said sequence controller comprises:

a counter for counting pulses of said clock signal; and a decoder for decoding the count output of said counter to provide said sequence control signals, said sequence control signals also controlling each said second memory, said sequence controller operating such that color difference signal values occurring at the end of the first third of said hold time are written into said at least one memory, and color difference signal values occurring at the end of the second third of said hold time are written into said second memory; and wherein:

in said first circuit branch the contents of said at least one memory and said second memory are written via said switch into said output register at the end of the first third and at the end of said second third, respectively, of said steepened leading edge;

in said second circuit branch the contents of said at least one memory and said second memory are written via said switch into said output register at the end of the first third and the second third, respectively, of said steepened leading edge; and the input of the respective output register of each of said first and second circuit branches is connected to the output of the respective first delay element at all times except at the end of said first third and said second third of said steepened leading edge.

* * * * *